UNITED STATES PATENT OFFICE.

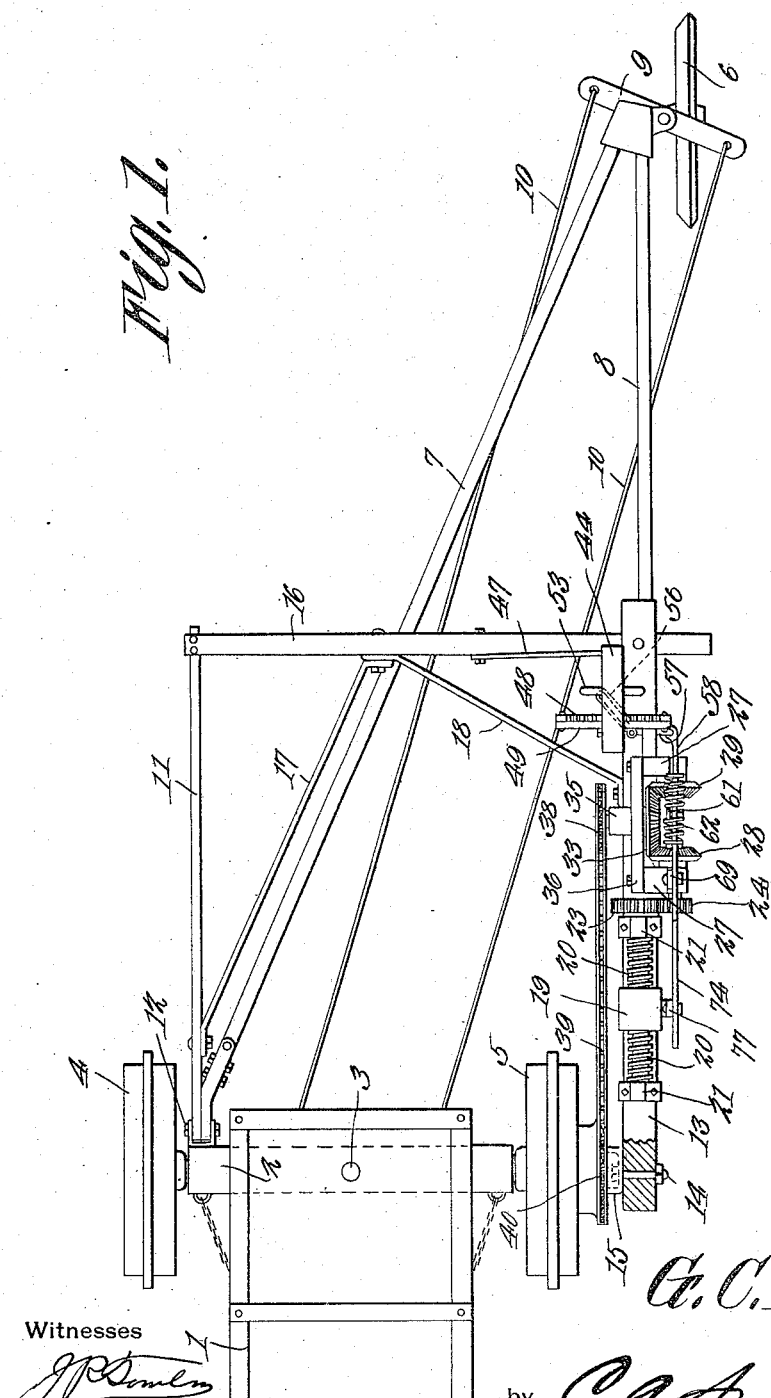

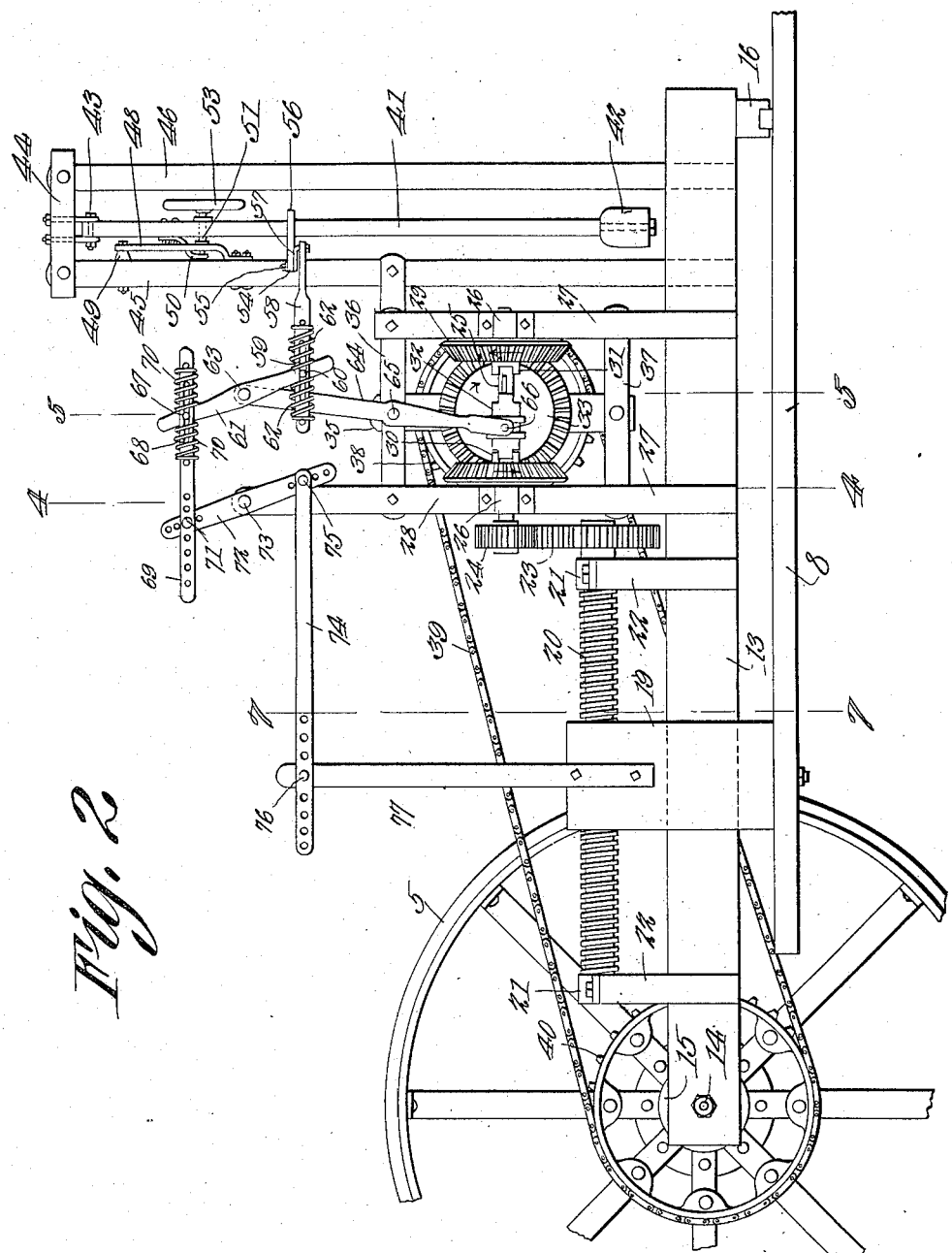

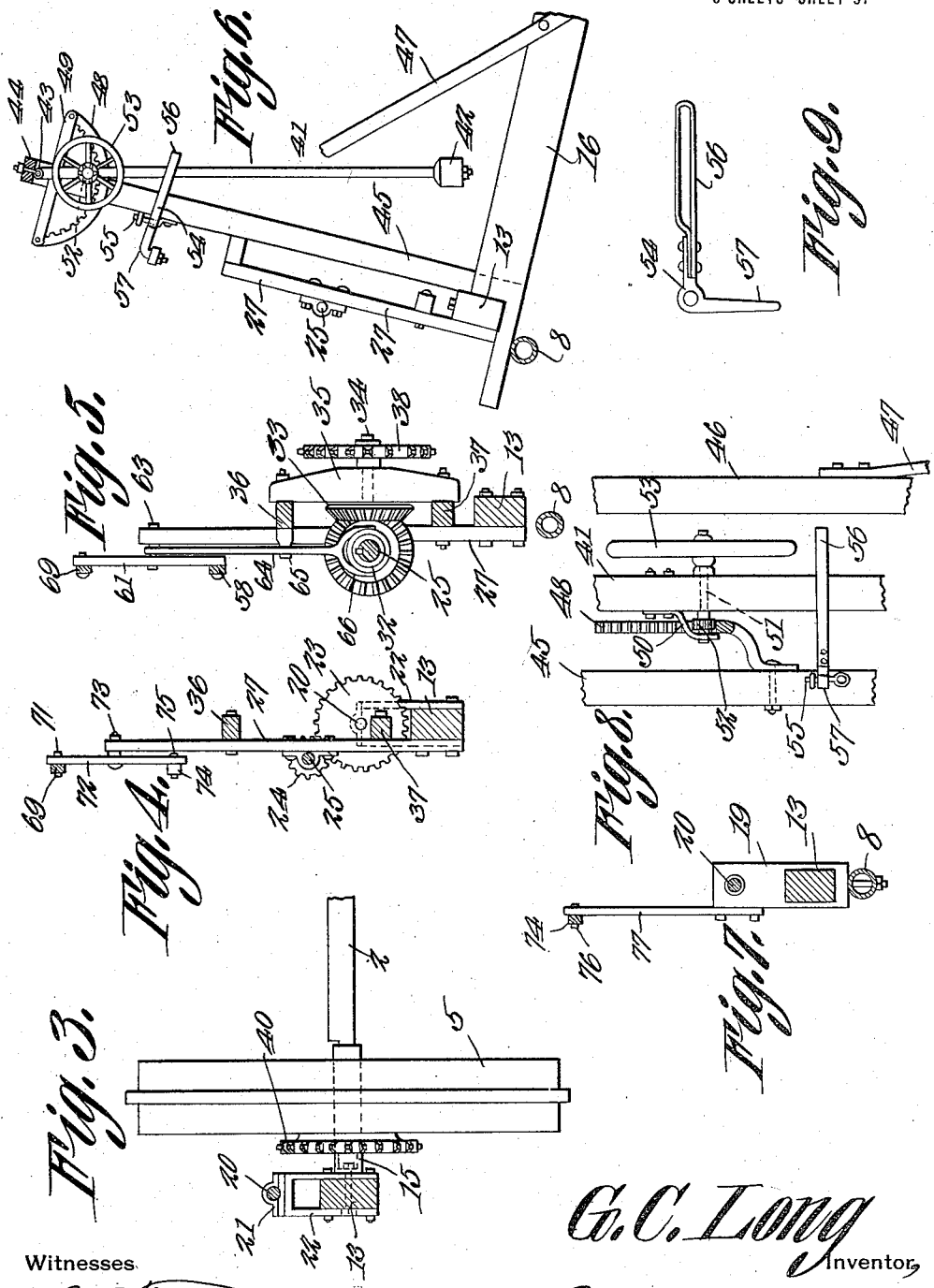

GUY C. LONG, OF TIMBER LAKE, SOUTH DAKOTA.

AUTOMATIC ADJUSTING MECHANISM FOR TRACTOR-GUIDES.

1,195,373.  Specification of Letters Patent.  Patented Aug. 22, 1916.

Application filed January 24, 1916. Serial No. 73,976.

*To all whom it may concern:*

Be it known that I, GUY C. LONG, a citizen of the United States, residing at Timber Lake, in the county of Dewey and State of South Dakota, have invented a new and useful Automatic Adjusting Mechanism for Tractor-Guides, of which the following is a specification.

The present invention appertains to automatic guiding devices for tractors, such as are employed for plowing or tilling the soil, and aims to provide a novel and improved mechanism for controlling or adjusting such a guiding device automatically when the tractor is used upon a hillside in which event there is a tendency for the tractor to run or turn sidewise either away from or toward the guide furrow adjacent which the tractor runs.

The present mechanism is intended to operate the guiding device when the tractor is running upon a hillside, so that compensation is made for the turning tendency of the tractor, to maintain the tractor in proper position relative to the guide furrow, whereby the furrows being made by the tractor will be arranged properly with respect to the guide furrow, to prevent strips of unfurrowed soil, or strips which are furrowed double.

The present mechanism is controlled by a pendulum swinging transversely of the tractor, whereby the pendulum in swinging to one side or the other will cause the mechanism to be properly operated, means being provided whereby the amount of movement of the pendulum according to the transverse inclination of the tractor will control the amount of movement of the mechanism, proportional to the inclination of the ground, since there is a greater tendency for the tractor to turn or run to one side upon ground which is arranged at a greater angle to the horizontal than upon soil which is not on such an incline.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Figure 1 is a plan view of the mechanism, portions being broken away. Fig. 2 is an enlarged side elevation thereof, with portions broken away. Fig. 3 is an enlarged fragmental view illustrating the steering wheel of the tractor which drives the present mechanism. Figs. 4 and 5 are vertical sections on the respective lines 4—4 and 5—5 of Fig. 2, on a reduced scale. Fig. 6 is a detail view illustrating the pendulum and associate parts, portions being broken away. Fig. 7 is a section on the line 7—7 of Fig. 2, on a reduced scale. Fig. 8 is an enlarged fragmental detail illustrating the controlling means of the pendulum. Fig. 9 is an enlarged plan view of the pendulum lever.

The present mechanism is used on the steering and guiding device of a plow tractor 1 having the front axle 2 pivoted, as at 3, the steering wheels 4 and 5 being journaled upon the terminals of the axle in the ordinary manner. The tractor is steered automatically, according to common practice, by a guide wheel 6 running in the last furrow previously plowed, and connected to the forward ends of a pair of forwardly converging poles 7 and 8 which have their rear ends connected with the opposite terminals of the axle 2. The spindle or standard of the guide wheel 6 has a lever 9 attached thereto which has attached thereto rods or cables 10 whereby the guide wheel 8 can be angled to swing the poles 7—8 toward one side or the other for purpose of steering the tractor in the well known manner.

The guide wheel 6 in following the guide furrow will hold the poles 7—8 properly arranged so that the tractor is steered to move adjacent the guide furrow, in order that the furrows being plowed will be properly arranged, but should the tractor turn or run sidewise, it is evident that the steering device would not fulfil its function properly. Difficulty has been encountered with the apparatus above described when the tractor is used upon hillsides, due to the turning tendency of the tractor either toward or away from the guide furrow, it being noted that when the tractor is run along a hillside, it has a tendency to turn or run to one side down the hill, so that if the tractor is running along the guide furrow at that side thereof nearer the top of the hill, the tractor has a tendency to shift toward the guide furrow, resulting in the soil being plowed twice along the guide furrow, and if the tractor is running along the guide furrow at that side thereof nearest the bottom of the hill, the tractor has a tendency to shift away from the guide furrow thereby leaving an unplowed strip of ground. In any case, the guiding of the tractor is destroyed, and this involves considerable trouble, especially when the automatic guiding of the tractor is depended upon. The present mechanism is intended to adjust the guiding device when the tractor is upon a hillside, to compensate for the tendency of the tractor to shift or turn sidewise due to the tendency of the tractor to turn down hill.

In carrying out the invention, a forwardly projecting frame is attached to the axle, said frame comprising a forwardly projecting side bar 11 having its rear end connected to the axle adjacent one end thereof, by means of a bolt or pivot element 12, there being an opposite forwardly projecting side bar 13 having its rear end pivotally connected by a bolt or pivot element 14 with a hub cap 15 attached to the hub of the wheel 5. The forward ends of the bars 11 and 13 are connected by a cross bar 16, and braces 17—18 are secured between the cross bar 16 and the respective bars 11 and 13 to render the frame rigid. The cross bar 16 rests upon the pole 7 to support the frame, and the rear terminal of the pole 8 is secured to the lower end of a slide 19 mounted for longitudinal sliding movement upon the bar 13. The bar 13 and pole 8 are thus slidably connected, which provides for the adjustment of the guiding device since the pole 8 can be shifted forwardly and rearwardly relative to the axle 2 to change the relation of the guide wheel 6 with the axle 2.

Means are provided for adjusting the slide 19 upon the bar 13, to adjust the guiding device, and to this end a longitudinal screw 20 disposed above the bar 13 is threaded through the upper portion of the slide 19, and its terminals are journaled in bearings 21 at the upper ends of pedestals 22 attached to the bar 13. Attached to the forward terminal of the screw 20 is a spur gear 23 meshing with a spur gear 24 secured upon the rear end of a longitudinal shaft 25 journaled in bearings 26 attached to longitudinally spaced standards 27 attached to the bar 13 in advance of the screw 20. A pair of opposed bevel gears 28—29 are rotatable upon the shaft 25, and are provided with the respective clutch hubs 30—31, and a clutch member 32 is feathered or splined upon the shaft 25 between said gears 28—29, and is alternately engageable with the clutch hubs. When the clutch member 32 is midway between the clutch hubs, the gears 28—29 can rotate without rotating the shaft 25, and when the clutch member is engaged alternately with the clutch hubs 30—31, the gears 28—29 rotate the shaft 25 in opposite directions, since the said gears rotate in opposite directions. The gears 28—29 are rotated by a bevel gear 33 meshing with both of said gears 28—29, and secured upon a short shaft 34 journaled through a yoke 35 having its upper and lower ends attached to the respective cross pieces 36 and 37 attached to the standards 27 above and below the shaft 25. Attached to the shaft 34 at the opposite side of the yoke 35 from the gear 33, is a sprocket wheel 38 connected by an endless sprocket chain 39 with a sprocket wheel 40 bolted or otherwise fastened to the outer side of the wheel 5 of the tractor, whereby said wheel 5 acts as a driving medium for the present mechanism when the tractor is in motion. The present mechanism is therefore operated proportional to the movement of the tractor.

The operating means is controlled by the clutch member 32 which is operated by a pendulum 41, which is provided at its lower end with a suitable weight 42, and which has its upper end pivoted, as at 43, to a cross piece or yoke 44 attached to the upper ends of longitudinally spaced standards 45—46 attached to the bar 13 in front of the standards 27, the pendulum 41 being suspended for transverse swinging movement, in order that when the tractor is tilted sidewise, the pendulum will swing to one side, as suggested in Fig. 6. The standard 46 is preferably connected with the cross bar 16 by a brace 47 for purpose of rigidity.

In order to prevent the pendulum from swinging too freely, and to avoid the minor oscillations of the pendulum due to slight transverse movements of the tractor, an arcuate rack 48 curved about the fulcrum of the pendulum as a center, is terminally attached to a supporting bar 49 attached to the standard 45, and a bracket 50 is attached to the pendulum above the rack 48 and projects over the remote side of the rack, so that the rack is guided between the pendulum and bracket 50, or in other words, the pendulum is guided properly for transverse swinging movement by the rack. A shaft 51 is journaled through the pendulum and bracket 50 above the rack and has a pinion 52 secured thereon meshing with the rack, and a wheel 53 of sufficient weight is secured upon said shaft, whereby the inertia created by the wheel 53 will prevent the minor or unwarranted oscillations of the pendulum. The pendulum in oscillating, will carry the shaft 51 along the rack, and the pinion 52 meshing with the rack will rotate said shaft, thus necessitating the rotation of the wheel 53.

The oscillation of the pendulum is thus retarded, which will avoid the minor oscillations thereof, although the pendulum can swinging slowly or gradually to one side if the tractor is tilted laterally.

The pendulum 41 operates a bell crank lever 54 fulcrumed at its elbow, as at 55, to the standard 45, and having a forwardly projecting slotted or loop-shaped arm 56 through which the pendulum projects, said arm 56 being swingable transversely, whereby the lever 54 is operated when the pendulum is swung. The other arm 57 of the lever 54 is pivotally connected with one end of a rearwardly projecting link 58 having a longitudinal slot 59 receiving the pin or lug 60 projecting from the lower arm of a floating differential or compensating lever 61 fulcrumed intermediate its ends, as at 63, to the upper end or arm of a clutch operating lever 64. This lever 64 is fulcrumed intermediate its ends, as at 65, to the cross piece 36, and the lower end of the lever 64 has a fork 66 engaging the annular groove of the clutch member 32, whereby the lever 64 in being swung will move or shift the clutch member between the clutch hubs 30—31. A pair of coiled expansion springs 62 are mounted upon the link 58, and the lower arm of the lever 61 projects between said springs, whereby the link 58 in being moved in either direction will yieldably move or swing the lever 61, thus absorbing shocks and eliminating injurious strains. The upper arm of the floating lever 61 has an outstanding pin or lug 67 working in a longitudinal slot 68 in a link 69, a pair of coiled wire expansion springs 70 being secured upon the link 69 so that the upper arm of the lever 61 propects between said springs. The movement of the link 69 in either direction yieldably swings the lever 61 to prevent shocks being transmitted between the lever 61 and link 69. The link 69 is pivotally and adjustably connected, as at 71, to the upper end or arm of a lever 72 approximately parallel with the lever 61, and the lever 72 is fulcrumed between its ends, as at 73, to the upper end of the rear standard 27. The lower arm of the lever 72 is pivotally and adjustably connected, as at 75, with the forward end of a link 74, and the rear terminal of said link 74 is pivotally and adjustably connected, as at 76, with the upper end of a standard or arm 77 attached to the slide 19.

When the tractor is on level ground, with the present mechanism idle, the slide 19 is in normal position, between the ends of the screw 20, and the pendulum 41 is approximately perpendicular with the frame of the present mechanism. The pendulum is thus in normal intermediate or neutral position, the same as the slide 19, and in this event, the lever 64 is also in intermediate position with the clutch member 32 in neutral position between the clutch hubs 30—31, whereby the gears 28 and 29 are rotated idly by the gear 33 which is operatively connected with the wheel 5, the gear 33 being rotated continually when the tractor is in motion. Now, supposing that the tractor is tilted to one side, as when running upon a hillside, so that the pendulum 41 swings to the left, the left side of the tractor being lower than the right side, the bell crank lever 54 will be swung to pull the link 58 forwardly, and the lower arm of the floating lever 61 will therefore be swung forwardly, as seen in Fig. 2. The upper arm of the lever 64 being connected with the lever 61, will be swung forwardly, the link 69 being held stationary due to the fact that the slide 19 is at the present moment immovable, whereby the forward movement of the lower arm of the lever 61 will move the fulcrum 63 forwardly to swing the clutch lever 64 to the position illustrated in Fig. 2. The lower arm of the lever 64 is therefore swung rearwardly to move the clutch member 32 into engagement with the clutch hub 30 of the gear 28, and the gear 28 is thus connected with the shaft 25, rotating said shaft in the proper direction. The screw 20 being geared to the shaft 25 will therefore be rotated, and will move the slide 19 slowly forward as the tractor moves forward, and proportional to the movement of the tractor. The slide 19 being moved forward will move the pole 8 forward relative to the bar 13, that is, the slide 19 tends to move the pole 8 forwardly, but the guide wheel 6 being disposed in the guide furrow, cannot move transversely since it will rest against one side of the furrow, and the pole 8 cannot therefore move forward to any appreciable distance, since to do so the guide wheel 6 and pole 7 must be free to move toward the left, as seen in Fig. 1. Consequently, the bar 13 of the frame is forced rearwardly, relative to the pole 8, thus swinging the axle 2 clockwise as seen in Fig. 1, and directing the tractor toward the right, thus compensating for the tendency of the tractor to turn to the left. The slide 19 in moving forwardly will force the link 74 ahead of the standard 77, thus swinging the lower arm of the lever 72 forwardly, and swinging the upper arm of said lever rearwardly. The link 68 is thus pulled rearwardly, thus swinging the upper arm of the floating lever 61 rearwardly, and moving the fulcrum 63 likewise. The upper arm of the clutch lever 64 is thus swung rearwardly gradually, and after the tractor has moved a predetermined distance or the length of the field, the present mechanism being properly adjusted to accomplish this result, the clutch lever 64 is swung back to neutral position to disengage the clutch member 32 from the clutch hub 30 thus allowing the gear 28 to run idly without rotating the shaft 25 further.

Particular attention is directed to the fact that the farther the pendulum 41 swings relative to the frame, due to the transverse inclination of the tractor, the more will the lower arm of the floating lever 61 be moved forwardly, and this will necessitate the slide 19 moving forwardly farther relative to the bar 13 to return the clutch lever 64 to intermediate position before the rotation of the screw is stopped. This result is accomplished by means of the floating differential or compensating lever 61 to which the pendulum and slide 19 are connected, said floating lever being fulcrumed to the clutch lever.

When the tractor is turned around and moved along the hillside in the opposite direction, it will naturally be tilted in the opposite direction, and the pendulum 41 will therefore swing to the right relative to the frame. This will swing the lever 54 to push the link 58 rearwardly, and the lower arm of the floating lever 61 is swung rearwardly to swing the upper arm of the clutch lever 64 likewise, thus shifting the clutch member 32 forwardly into engagement with the clutch hub 31. The shaft 25 will now be rotated in the opposite direction, to so rotate the screw 20 as to move the slide 19 rearwardly relative to the bar 13. There is therefore a tendency to pull the pole 8 rearwardly relative to the bar 13, but this would necessitate the guide wheel 6 being swung with the pole 7 to the right. This is prevented due to the fact that the guide wheel 8 is in the guide furrow, and as a result the bar 13 is moved forwardly by the screw relative to the pole 8, thus swinging the axle 2 in the proper direction to compensate for the tendency of the tractor to run or turn down the hill. In this case, it is also noted that the slide 19 must be moved proportional to the distance the pendulum has swung relative to the frame, before the clutch member 32 is again disengaged.

From the foregoing, taken in connection with the drawings, it is believed that the advantages and attributes of the present mechanism will suggest themselves to those skilled in the art, without further comment being necessary. It will be appreciated, however, that various changes or alterations in the mechanism are possible, within the scope of what is hereinafter claimed, without departing from the spirit of the invention, in adapting the mechanism to various conditions.

Having thus described the invention, what is claimed as new is:

1. The combination with a tractor having a steering axle, of a guide wheel, connections between said wheel and the opposite terminals of said axle, one of said connections comprising slidably connected members, and pendulum controlled means for adjusting said members relative to one another.

2. The combination with a tractor having a steering axle, of a guide wheel, connections between said wheel and opposite terminals of said axle, one of said connections comprising slidably connected members, actuating means for moving said members relative to one another, and a pendulum controlling said means.

3. The combination with a tractor having a steering axle, of a guide wheel, connections between said wheel and the opposite terminals of said axle, one of said connections comprising slidably connected members, actuating means operable for moving said members in either direction relative to one another, and a transversely swingable pendulum operatively connected to said means to bring the same into operation for moving said members in one direction or the other relative to one another according to the direction in which the pendulum swings.

4. The combination with a tractor having a steering axle, of a guide wheel, connections between said wheel and the opposite terminals of said axle, one of said connections comprising slidably connected members, means between said members for moving them relative to one another, actuating means, means for connecting the aforesaid means, and a transversely swingable pendulum means, and a transversely swingable pendulum controlling the third mentioned means.

5. The combination with a tractor having a steering axle, of a guide wheel, connections between said wheel and the opposite terminals of said axle, one of said connections comprising slidably connected members, means between said members for moving them relative to one another, actuating means, means for connecting the aforesaid means, a transversely swingable pendulum means controlling the third mentioned means, and means operated when said members are moved relative to one another for moving the third mentioned means opposite to the direction in which it is moved by the pendulum.

6. The combination with a tractor having a steering axle, of a guide wheel, connections between said wheel and the opposite terminals of said axle, one of said connections comprising slidably connected members, an actuating device operated by the tractor, means connecting said members for moving them relative to one another, means connecting said device and means including a reversible clutch device so that said members can be moved in either direction relative to one another, and a transversely swingable pendulum for operating said clutch device.

7. The combination with a tractor having a steering axle, of a guide wheel, connections between said wheel and the opposite terminals of said axle, one of said connections comprising slidably connected members, an actuating device operated by the tractor, means connecting said members for moving them relative to one another, means connecting said device, and means including a reversible clutch device so that said members can be moved in either direction relative to one another, a transversely swingable pendulum for operating said clutch device whereby said members are moved in one direction or the other relative to one another according to the direction in which the pendulum is swung, and means operated when said members are moved relative to one another for operating the clutch device opposite to the direction in which it is operated by the pendulum.

8. The combination with a tractor having a steering axle, of a guide wheel, connections between said wheel and the opposite terminals of said axle, one of said connections comprising slidably connected members, actuating means, means for moving said members relative to one another, a clutch device connecting said means and operable to move said members in either direction relative to one another, said clutch device including a clutch member, a floating lever connected with said clutch member, a transversely swingable pendulum connected with said floating lever, and means operated when said members are moved relative to one another and connected with said floating lever to move it in a direction opposite to the direction in which the floating lever is moved by the pendulum.

9. The combination with a tractor having a steering axle, of a guide wheel, connections between said wheel and the opposite terminals of said axle, one of said connections comprising slidably connected members, one of said members being connected with the axle, a screw carried by said member longitudinally thereof, and the other member having means engaging said screw, a shaft operatively connected with said screw, a pair of opposite bevel gears upon said shaft having clutch hubs, a clutch member slidable upon said shaft and alternately engageable with said clutch hubs, a bevel gear meshing with both of the aforesaid gears and operated by the tractor, a clutch lever having one arm engaged with the clutch member, a floating lever fulcrumed between its ends to the other arm of the clutch lever, a transversely swingable pendulum, means connecting the pendulum and one arm of the floating lever, and means connecting the other arm of the floating lever and the second mentioned member.

In testimony that I claim the foregoing as my own, I have hereto affixed my signature in the presence of two witnesses.

GUY C. LONG.

Witnesses:
A. L. ANDERSON,
J. H. REED.

Copies of this patent may be obtained for five cents each, by addressing the "Commissioner of Patents, Washington, D. C."